United States Patent
Marl et al.

(10) Patent No.: US 7,676,565 B2
(45) Date of Patent: Mar. 9, 2010

(54) LIGHT WEIGHT SOFTWARE AND HARDWARE INVENTORY

(75) Inventors: Craig C. Marl, Seattle, WA (US); Nirmal R. Soy, Kirkland, WA (US); Rajive Kumar, Sammamish, WA (US); Steve P. Shih, Bellevue, WA (US); Thanjavur V. G. Prabhu, Redmond, WA (US); Yasufumi Shiraishi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 11/342,018

(22) Filed: Jan. 27, 2006

(65) Prior Publication Data

US 2007/0180059 A1    Aug. 2, 2007

(51) Int. Cl.
*G06F 15/173* (2006.01)
(52) U.S. Cl. .................................. 709/223; 709/224
(58) Field of Classification Search .................. 370/260, 370/313, 328, 468, 486, 230; 709/202, 204, 709/220, 223, 225, 230; 711/117, 169; 713/158; 707/5, 204, 201, 200, 2, 104.1
See application file for complete search history.

(56) References Cited

U.S. PATENT DOCUMENTS

| | | | |
|---|---|---|---|
| 5,894,516 | A | 4/1999 | Brandenburg |
| 5,999,740 | A | 12/1999 | Rowley |
| 6,237,020 | B1 | 5/2001 | Leymann et al. |
| 6,286,041 | B1 | 9/2001 | Collins, III et al. |
| 6,665,867 | B1 | 12/2003 | Ims et al. |
| 6,675,382 | B1 | 1/2004 | Foster |
| 6,725,453 | B1 | 4/2004 | Lucas et al. |
| 6,912,711 | B1 | 6/2005 | Curtis et al. |
| 6,954,930 | B2 | 10/2005 | Drake et al. |
| 2002/0129356 | A1 | 9/2002 | Hellerstein et al. |
| 2003/0220944 | A1* | 11/2003 | Lyman Schottland et al. .... 707/203 |
| 2003/0236772 | A1* | 12/2003 | Makris et al. .................. 707/3 |
| 2004/0002943 | A1* | 1/2004 | Merrill et al. .................. 707/1 |
| 2004/0123286 | A1 | 6/2004 | Kang et al. |
| 2004/0139430 | A1 | 7/2004 | Eatough et al. |
| 2004/0181790 | A1 | 9/2004 | Herrick |
| 2005/0027846 | A1* | 2/2005 | Wolfe et al. ................. 709/223 |
| 2005/0234931 | A1* | 10/2005 | Yip et al. .................... 707/100 |
| 2006/0224361 | A1* | 10/2006 | McIntyre et al. ............ 702/183 |
| 2008/0059606 | A1* | 3/2008 | Konopka et al. ............ 709/217 |

OTHER PUBLICATIONS

Ric Liang, Inventory Software with Microsoft's Application Compatibility Analyzer, TechRepublic.com, http://articles.techrepublic.com.com/5100-10878_11-5035230.html.*

(Continued)

*Primary Examiner*—Wing F Chan
*Assistant Examiner*—Charles Murphy
(74) *Attorney, Agent, or Firm*—Workman Nydegger

(57) ABSTRACT

A method of inventorying software and/or hardware. The method may be practiced for example in a network computing environment including at least one client and at least one server. The method includes requesting a rule file from the server. The rule file is received from the server. Information is gathered about the software and/or hardware at the client based on rules in the rule file. The results of gathering information about the software and/or hardware at the client is sent to the server.

16 Claims, 2 Drawing Sheets

OTHER PUBLICATIONS

PCDUO Enterprise Managing the Networked Enterprise "Software Distribution" PC-DUO Enterprise Software Distribution enables users to remotely install applications and updates within minutes, eliminating the need to visit individual PCs Vector Networks Inc., pp. 1-2 http://www.vector-networks.com/enterprise/datasheets/software_distribution.pdf.

LookSmart "PictureTaker supports Windows Me—LANovation has announced version 3.1 of its PictureTaker software deployment tools—Brief Article—Product Announcement", pp. 1 Copyright 2000 Plesman Publications Copyright 2001 Gale Group http://findarticles.com/p/articles/mi_m3563/is_25_16/ai_68743882/print.

Novell Documentation: ZENworks 7—Upgrade Using a Server Software Package "Upgrade Using a Server Software Package", pp. 1-10 http://www.novel.com/documentation/zenworks7/index.html?page=/documentation/zenworks7/sm7install/data/bpejma0.html.

Kartik Kanakasabesan, IBM DeveloperWorks "Using Tivoli software distribution with Rational ClearCase UCM". pp. 1-12 http://www-128.ibm.com/developerworks/rational/library/5447.html.

* cited by examiner

LIGHT WEIGHT SOFTWARE AND HARDWARE INVENTORY

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Organizations often have a number of computers for use by employees or members of the organization. Due to various licensing requirements, business process requirements, inventory requirements and the like, organizations often have need to maintain an inventory of software and hardware installed on computer systems throughout the organization.

For example, licensing schemes often require a license be purchased for each machine that has a particular software title installed on it. Failure to properly license software can result in severe civil and criminal penalties. As such, it is often desirable to know how many copies of a particular software title are installed so as to be able to purchase the appropriate number of licenses.

Additionally, it may be desirable to know what software is installed on various machines within an enterprise to determine updates that should be installed to the various machines within the enterprise. For example, if a security patch is issued for a particular software title, it may be useful to know what machines require the security patch. By determining what machines have the particular software title installed, it can be determined what machines require the particular security patch.

Insofar as hardware is concerned, it may be desirable to determine what hardware is installed on machines in an enterprise. For example, it may be desirable to inventory hardware on machines so as to determine what upgrades are needed for planned software deployments. Inventory information may also be used to determine if entire machines should be replaced with newer equipment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of inventorying software and/or hardware. The method may be practiced for example in a network computing environment including at least one client and at least one server. The method includes requesting a rule file from the server. The rule file is received from the server. Information is gathered about the software and/or hardware at the client based on rules in the rule file. The results of gathering information about the software and/or hardware at the client is sent to the server.

Another embodiment includes a method of inventorying software and/or hardware. The method may be practiced for example in a network computing environment including at least one client and at least one server. The method includes receiving a request for a rule file from the client. A rule file is sent to the client identifying desired information about software and/or hardware at the client. An inventory file is received from the client including information about software and/or hardware as specified in the rule file.

Yet another embodiment described herein includes a computer-readable medium including a data structure for conveying inventorying information. The data structure may be implemented, for example, in a network computing environment including at least one client and at least one server. The data structure includes a number of data fields on the medium arranged in a hierarchical fashion. The data structure includes a first data field containing data representing a class argument including data defining an object for which to collect data at the client. The data structure further includes a second data field hierarchically below the first data field representing an instance argument including data defining an occurrence of the class argument. The data structure further includes a third data field hierarchically below the second data field representing a property argument including data defining an attribute of the instance argument.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment is directed to a system for obtaining an inventory of hardware and/or software at machines within an enterprise. An exemplary enterprise may include at least one inventory server and one or more client machines. The inventory server may, in one embodiment, include functionality of Windows Server Update Services available from Microsoft Corporation of Redmond Wash.

The client machines may contact the inventory server to discover if there are any rule files at the inventory server. The rule files include one or more rules specifying what inventory information should be obtained. For example, the rule files may specify that information is being sought regarding what processor, including information such as processor architecture, is installed at the client machines, how much and what type of memory is installed, what type of file structure is being used, what operating system is running, what particular software is installed, and so forth.

If a rule file exists at the inventory server, the client machine can download the rule file. In one embodiment, the rule file may be packaged at the inventory server in a cabinet file. The cabinet file may be signed such that it can be verified at the client machine to ensure that the cabinet file has not been maliciously altered or corrupted. Some embodiments include functionality for determining that a cabinet file has been altered or corrupted. When a rule file has been altered or corrupted, the rule file can be discarded and a request can be made to the server for the rule file again. Some embodiments include functionality for alerting the inventory server when an altered or corrupted cabinet file is received at the client machine. This allows the inventory server to perform corrective actions such as quarantining files, destroying files, resending corrected versions, and the like.

When a rule file has been received at the client, the client can then gather information about the client machine as specified in the rule file. For example, the client can gather information such as processor type and speed, memory type and amount, operating system at the client, software installed at the client, and/or other inventory information. This information can then be sent back to the server machine. In one embodiment, the information may be returned to the server machine in the form of an XML file containing the specified information.

At the server machine, the information returned from clients can be stored in a database. One or more APIs can then be used to mine information from the database to so as to be able to properly characterize information about hardware and software on computers within the enterprise.

Figure 1:
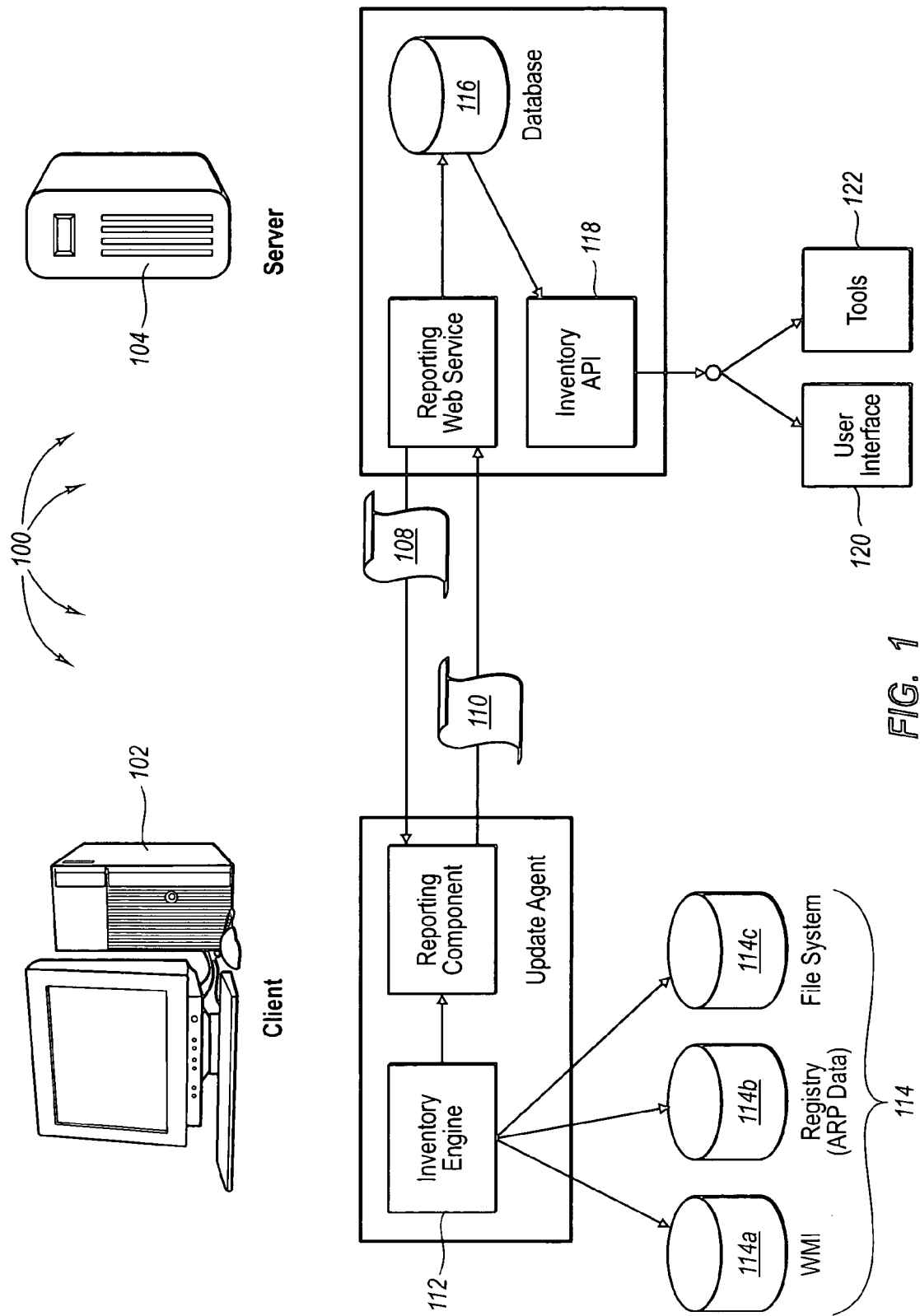
FIG. 1 illustrates a topology including a inventory server and a client to be inventoried.

Referring now to FIG. 1, a more detailed example of one embodiment is illustrated. FIG. 1 illustrates a portion of an enterprise network 100 including a client 102 and a server 104. While the example illustrated shows only a single client 102 and single server 104, it should be appreciated that embodiments may include multiple clients and servers. In the example shown in FIG. 1, the client 102 includes various hardware and software. For example, insofar as hardware is concerned, the client includes for example, a BIOS, one or more CPUs, a given amount and type of physical memory, a hard disk of a particular type and size, various input and output hardware components including video cards, network interface controllers, serial inputs, and the like. Insofar as software is concerned, the client 102 includes a particular operating system, drivers for the various hardware components, software application components, and the like. The client 102 may further include registry entries. The registry entries may include information describing installed software and configuration details of installed software.

In one embodiment, the client 102 can query the server 104 to discover if the server has any rule files 108. Rule files 108 typically include a set of inventory rules describing information desired by the server 104. The rule files 108 may specify what information is desired in a hierarchical fashion. For example, the rule file 108 may specify a desire for information about a particular class. The class is the type of object for which information is desired. For example, the rule file may specify classes such as disk drives, CPUs, software, drivers, memory, I/O devices and the like.

Below the class argument in the hierarchy of the rule file is an instance argument. The instance argument specifies an occurrence of a class on a machine. For example, within the software class, an instance may specify a particular software title such as Microsoft Office.

Below the instance argument in the hierarchy is a property argument. The property argument specifies a particular attribute of an instance that is desirable to be collected. For example, the property argument may specify that a "DisplayName" property of Microsoft Office should be collected.

In one embodiment, the rule files 108 may be structured as XML files. In one example, Web Services may be used to communicate between the server 104 and the client 102, such as to communicate rule files. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. Webmethods can be called to request and convey information.

One exemplary rule in a rule file may include a rule expressed as follows:

```
<WmiHandlerRequest Id="1">
    <Class Name="Win32_Processor" Key="DeviceID">
        <Property Name="DeviceID" Type="String" />
        <Property Name="Architecture" Type="UInt16" />
        ...
    </Class>
</WmiHandlerRequest>
```

In the above example, the rule specifies a handler and the data that should be collected. For instance, in the example shown above, the rule declares a WMI handler. The rule further specifies that the WMI handler should collect properties for a Win32 processor class. The properties to be collected include a device identification property and an architecture property. FIG. 1 illustrates a number of handlers 114. For example, FIG. 1 illustrates a WMI handler 114a, a registry handler 114b, and a file system handler 114c.

In the example shown in FIG. 1, the client 102 contacts a server 104 to determine if any rule files including inventory rules exist at the server 104. If a rule file 108 exists at the server 104, the rule file 108 can be downloaded to the client 102. The rule file 108 as described above may be implemented in a computer readable medium that may be downloaded in one exemplary embodiment from a hard coded URL. In one embodiment, the rule file 108 may be packaged as a compressed cabinet file for installation at the client 102. The cabinet file may be a signed cabinet file so as to ensure that the cabinet file has not been altered or corrupted. In one embodiment, the cabinet file may be signed by the server 104 such that cabinet files from other locations can be detected and discarded. In other embodiments, the cabinet file may be signed by a third party certificate issuer such as Verisign.

When the rule file 108 is received at the client 102, before gathering the information specified in the rule file 108, the client 102 can determine whether or not the rule file 108 has changed at the server 104. In one embodiment, this may be accomplished by calling a webmethod. If the rule file 108 has changed since being downloaded, the rule file 108 can be re-downloaded prior to creating an inventory as specified in the rule file 108.

At the client 102, the rule file 108 can be used to create an inventory file 110 that can be sent back to the server 104. At the client 102, an inventory engine 112 can be used to send requests for information to the handlers 114. As described previously, the rule file 108 may specify the particular handler, the class, and the property to be gathered. Thus, the inventory engine 112 can direct requests to the appropriate handler 114. The handlers 114 can, in one embodiment, output XML code that contains the requested information. One exemplary piece of output XML code from a handler is illustrated below.

```
<WmiHandlerResponse RequestId="1">
    <Class Name="Win32_Processor">
        <ClassInstance ChangeType="Added" KeyValue="CPU0">
            <Property Name="DeviceID" Value="CPU0" />
            <Property Name="Architecture" Value="0" />
            ...
        </ClassInstance>
    </Class>
    <Class Name="Win32_Processor">
        <ClassInstance ChangeType="Added" KeyValue="CPU1">
            <Property Name="DeviceID" Value="CPU1" />
            <Property Name="Architecture" Value="0" />
            ...
        </ClassInstance>
    </Class>
</WmiHandlerResponse>
```

This example is an output from a WMI handler that corresponds to the exemplary rule file XML code described above. In this example, the particular class, instance, and property arguments requested are included.

If a number of different classes are being requested in a particular rule file 108, the inventory engine 112 can assemble the different XML code pieces into an inventory file 110. The inventory file 110 can then be sent to the server 104. The inventory file may be sent using an appropriate webmethod or by any other suitable means. The XML content of the inventory file may be compressed, such as by being compressed into a cabinet file. In addition, in some embodiments, the information may be in the form of a delta report that includes only changed information. Thus for example, if inventory information has previously been sent to the server 104, and current inventory information includes elements that have not changed since the previous inventory information was sent, then only those elements in the current inventory information that have changed will be sent to the server 104 so as to prevent redundant data from being sent to the server 104.

Some exemplary embodiments further include additional functionality that allows the client 102 to determine what type of information to send in the inventory file 110. For example, a webmethod may be included that allows a client to determine what type of inventory report should be included in the inventory file 110. As a result of invoking the webmethod, the server 104 may respond with return values indicating that a delta inventory should be returned, a full inventory should be returned, or that new inventory rules should be synchronized. The delta inventory, as described above, results in entries that have not been previously sent from the client 102 to the server 102 being sent. The full inventory results in an inventory file 110 being sent that includes responses to all available requested properties. A result indicating that new inventory rules should be synchronized results in the client 102 downloading a new rule file 108 to obtain new rules requesting various properties.

At the server 104, information from the inventory file 110 can be stored in a database 116. As will be described in more detail below, the database 116 can then be mined to present aggregated data information.

The inventory file may be reported to the server 104 through an inventory reporting webmethod. The inventory reporting webmethod accepts inventory files 110 from the client and inserts the inventory information from the inventory files 110 into a queue where it can be inserted into database tables in the database 116.

Embodiments may include functionality for handling errors in the inventory files 110. For example if the inventory information in an inventory file 110 cannot be appropriately added to the database 116, the information in the inventory file 110 can be discarded. In one embodiment, the particular client 102 from which the inventory file 110 was received can then be marked for a full inventory. As such, subsequent interaction between the server 104 and client 102 can be used to obtain a full inventory as specified in inventory rules in the rule file 108.

At the server 104 an API may be used to mine data from the database 116. The API may include functionality for assembling various combinations of hardware inventory information and software inventory information for individual client machines and or an aggregated group of client machines.

Figure 2:
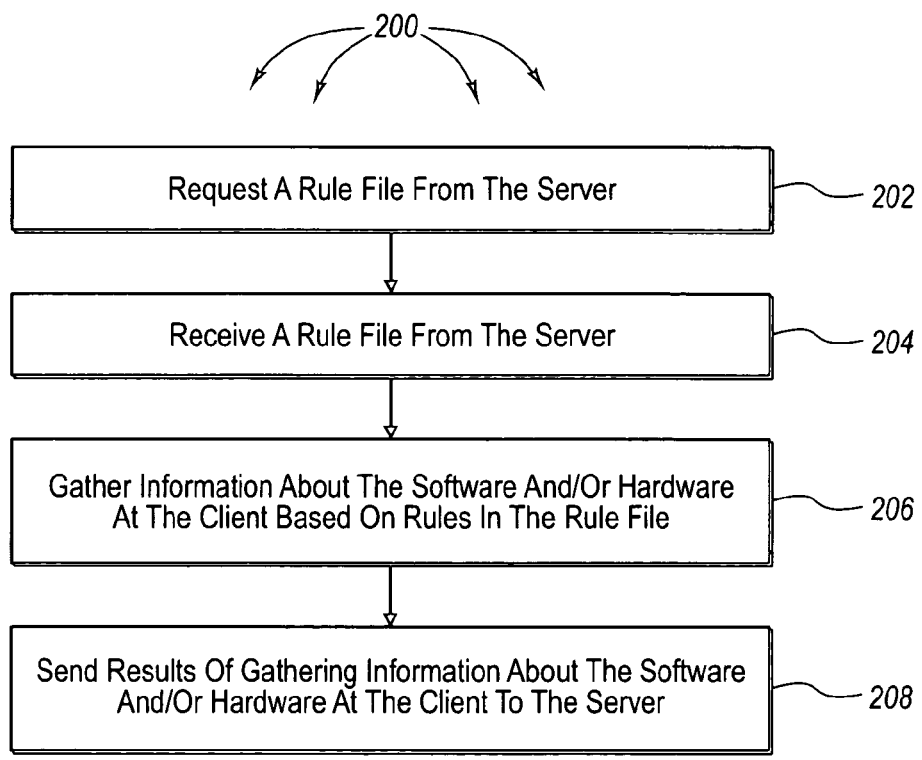
FIG. 2 illustrates a method of inventorying one or more clients.

Referring now to FIG. 2, a method 200 of inventorying software is illustrated. The method 200 may be practiced for example, in a network computing environment including at least one client and at least one server. The method includes requesting a rule file from the server (act 202). As illustrated above in FIG. 1, a client 102 may request a rule file 108 from a server 104.

FIG. 2 further illustrates that the method 200 includes receiving a rule file from the server (act 204). As shown in FIG. 1, the rule file 108 may be sent from the server 104 to the client 102. In one embodiment, the rule file received from the server may be a signed cabinet file. By sending a cabinet file, the rule file may be compressed so as to conserve network bandwidth. Signing the cabinet file may include in one embodiment providing a certificate generated at the server 104 that can be validated to the server 104. The method 200 may further include verifying the signature of the cabinet file to determine if the signature is valid. Verifying the signature may include, for example, determining that the certificate corresponds to the server 104 from which the cabinet file was sent. In other words, the server 104 is the root of the trust chain for the certificate.

In one embodiment, if the signature of the cabinet file is determined to be invalid, the method 200 may further include requesting the rule file again from the server. This allows the client 102 to attempt to receive the appropriate rule file in case of errors caused by transmission or otherwise. Additionally or alternatively, if the signature of the cabinet file is determined to be invalid, the method may further include sending a message to the server indicating that the cabinet file signature is invalid. This allows the client 102 to alert the server 104 that there are problems with the signature, cabinet file, rule file, and the like. As such, the server 104 can perform corrective actions such as deleting corrupt or virus infected files, safeguarding against attacks, alerting other client systems of problems with files, and the like.

In one embodiment, receiving a rule file from the server (act 204) may include receiving a cabinet file and a hash of the cabinet file. For example, a cabinet file containing a rule file 108 may be hashed. The hash may be sent to the client such as through a separate metadata file. The client 102 can then calculate a hash for the received cabinet file and compare the calculated hash to the received hash value. As such, the method 200 may further include verifying the hash of the cabinet file.

Referring once again to FIG. 2, the method 200 may further include gathering information about the software and/or hardware at the client based on rules in the rule file (act 206). For example, and referring again to FIG. 1, various handlers 114 may be used to gather information requested by the rule file 108. Such information may include, for example, various properties of various instances in the classes defined in the rule file. In one embodiment gathering information about the software and/or hardware at the client based on rules in the rule file (act 206) may include assembling XML code from different handlers into an XML inventory file. As illustrated in the examples above, each handler 114 may be assigned various inventory gathering tasks by the inventory engine 112. In response, each handler may produce a portion of XML code including the requested inventory information. Each of the XML code portions can be combined into an XML file that can be sent to the server 104.

Referring once again to FIG. 2, the method 200 further includes sending results of gathering information about the software and/or hardware at the client to the server (act 208). In one embodiment, sending results of gathering information about the software and/or hardware at the client to the server (act 208) may include sending an XML inventory file.

Sending results of gathering information about the software and/or hardware at the client to the server (act 208) may include sending a full inventory report as specified in the rule file. For example, a full inventory report includes a response to each of the entries in the rule file. The full report can be contrasted with a delta report, where a delta report includes information for entries in the rule file that have not previously been sent to the server 104. For example, if information about a processor class has already been sent previously to the server 104 in a previous transaction, a delta report inventory file will not include the same information about the processor as previously sent. However, a full report inventory file will include the processor information even though it was previously sent.

The method 200 may further include in an alternate embodiment sending results of gathering information about the software and/or hardware at the client to the server (act 208) including sending a delta report that includes new inventory information not previously sent to the server.

The method 200 may further include verifying that the rule file contains the most current rules. If the rule file does not contain the most current rules, the method may further include downloading a rule file with the most current rules.

Figure 3:
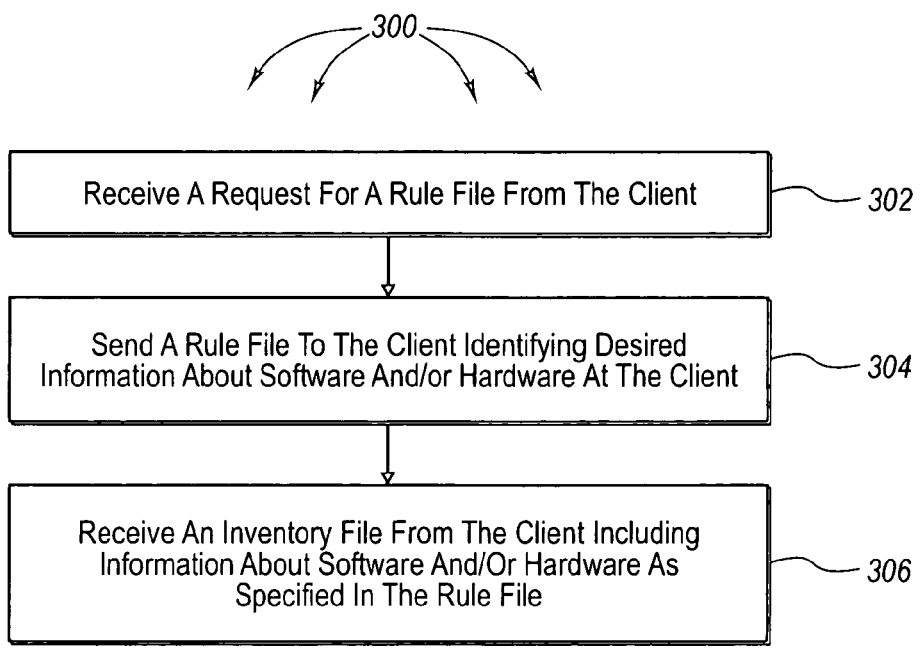
FIG. 3 illustrates an alternate method of inventorying one or more clients.

Referring now to FIG. 3 a method of inventorying software and/or hardware from the perspective of a server is illustrated. The method may be practiced for example in a network computing environment including at least one client and at least one server. The method includes receiving a request for a rule file from the client (act 302). For example, as illustrated in FIG. 1, a server 104 may receive a request from a client 102 for a rule file 108.

The method 300 further illustrates sending a rule file to the client identifying desired information about software and/or hardware at the client (act 304). FIG. 1 illustrates the server 104 sending the rule file 108 to the client 102. In one embodiment, the rule file is an XML file.

The method 300 further includes receiving an inventory file including information about software and/or hardware as specified in the rule file (act 306). As illustrated, the client 102 includes functionality for gathering information specified in the rule file and transmitting the information as an inventory file 110 to the server 104.

The method 300 may further include updating a database at the server with the information about software and/or hardware as specified in the rule file. For example, as shown in FIG. 1, the database 116 may be updated to include information returned in the inventory file 110.

The method 300 may further include mining the database for inventory information. For example, FIG. 1 illustrates an inventory API 118 that exposes interfaces for allowing inventory information about client computers in an enterprise to be mined. This allows inventory information about clients to be viewed such as through a user interface 120 or to be evaluated or used using software tools 122. Mining the database may include gathering inventory information about a particular client. For example, mining the database may allow information to be viewed about a particular client 102 in an enterprise network. Alternatively, mining the database may include gathering aggregated inventory information about a plurality of clients. For example, a report can be generated that summarizes the number of copies of a particular software title that has been installed throughout an enterprise.

The method 300 may further include attempting to update a database at the server with the information about software and/or hardware as specified in the rule file. If attempting to update the database fails, the method 300 may further include discarding the information about software and/or hardware as specified in the rule file and flagging the client for a full inventory.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network computing environment including at least one client and at least one server, a method of inventorying software and/or hardware, the method comprising:
   requesting a first rule file from the server;
   receiving the first rule file from the server, wherein the first rule file comprises a set of inventory rules describing information desired by the server, wherein the first rule file is organized hierarchically and includes a plurality of class arguments including class arguments for both software and hardware classes indicating that the server desires information about particular classes, instance arguments below the class arguments, wherein each the instance arguments specify an occurrence of a class on a machine, property arguments below the instance arguments, the property arguments specifying a particular attributes of instances;
   gathering information about the software and/or hardware at the client based on rules in the first rule file;
   sending results of gathering information about the software and/or hardware at the client to the server;
   requesting a second rule file from the server;
   receiving the second rule file from the server;
   wherein receiving a rule file from the server comprises receiving a signed cabinet file, and further comprising verifying the signature of the cabinet file to determine if the signature is valid;
   determining that the second rule file comprises an invalid signature; and
   as a result of determining that the second rule file comprises the invalid signature, sending a message to the server indicating that the second rule file signature is invalid, whereafter the second rule file is destroyed or quarantined at the server.

2. The method of claim 1, wherein sending results of gathering information about the software and/or hardware at the client to the server comprises sending an XML inventory file.

3. The method of claim 1, wherein gathering information about the software and/or hardware at the client based on rules in the rule file comprises assembling XML code from different handlers into an XML inventory file.

4. The method of claim 1, further comprising if the signature of the cabinet file is determined to be invalid, requesting the rule file again from the server.

5. The method of claim 1, further comprising if the signature of the cabinet file is determined to be invalid, sending a message to the server indicating that the cabinet file signature is invalid.

6. The method of claim 1, wherein receiving a rule file from the server comprises receiving a cabinet file and a hash of the cabinet file, the method further comprising verifying the hash of the cabinet file.

7. The method of claim 1, wherein sending results of gathering information about the software and/or hardware at the client to the server comprises sending a full inventory report as specified in the rule file.

8. The method of claim 1, wherein sending results of gathering information about the software and/or hardware at the client to the server comprises sending a delta report that includes new inventory information not previously sent to the server.

9. The method of claim 1, further comprising verifying that the rule file contains the most current rules; and if the rule file does not contain the most current rules, downloading a rule file with the most current rules.

10. In a network computing environment including at least one client and at least one server, a method of inventorying software and/or hardware, the method comprising:
    receiving a request for a rule file from the client;
    sending a first rule file to the client wherein the first rule file comprises a set of inventory rules describing information desired by the server, wherein the first rule file is organized hierarchically and includes a plurality of class arguments including class arguments for both software and hardware classes indicating that the server desires information about particular classes, instance arguments below the class arguments, wherein each the instance arguments specify an occurrence of a class on a machine, property arguments below the instance arguments, the property arguments specifying a particular attributes of instances;
    receiving an inventory file from the client including information about software and/or hardware as specified in the first rule file;
    receiving a request for a second rule file from the client;
    sending the second rule file from the server to the client;
    wherein sending a rule file from the server comprises sending a signed cabinet file, and wherein the signature of the cabinet file is verified by the client to determine if the signature is valid;
    receiving a message at the server from the client indicating that the second rule file signature is invalid as a result of the message indicating that the second rule file comprises an invalid signature; and
    destroying or quarantining the second rule file at the server.

11. The method of claim 10, wherein the rule file is an XML file.

12. The method of claim 10, further comprising updating a database at the server with the information about software and/or hardware as specified in the rule file.

13. The method of claim 12, further comprising mining the database for inventory information using one or more APIs at the server.

14. The method of claim 13, wherein mining the database comprises gathering inventory information about a particular client.

15. The method of claim 13, wherein mining the database comprises gathering aggregated inventory information about a plurality of clients.

16. The method of claim 10, further comprising attempting to update a database at the server with the information about software and/or hardware as specified in the rule file and if attempting to update the database fails, discarding the information about software and/or hardware as specified in the rule file and flagging the client for a full inventory.

* * * * *